US010802802B2

(12) United States Patent
Haupt et al.

(10) Patent No.: US 10,802,802 B2
(45) Date of Patent: *Oct. 13, 2020

(54) EXTENDING A VIRTUAL MACHINE INSTRUCTION SET ARCHITECTURE

(71) Applicant: Oracle International Corporation, Redwood Shores, CA (US)

(72) Inventors: Michael Haupt, Postdam (DE); Maurizio Cimadamore, Donabate (IE); Brian Goetz, Williston, VT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,587

(22) Filed: Apr. 9, 2018

(65) Prior Publication Data
US 2018/0232217 A1    Aug. 16, 2018

Related U.S. Application Data

(63) Continuation of application No. 15/005,448, filed on Jan. 25, 2016, now Pat. No. 10,055,208.
(Continued)

(51) Int. Cl.
*G06F 9/44* (2018.01)
*G06F 8/41* (2018.01)
*G06F 9/455* (2018.01)

(52) U.S. Cl.
CPC ............. *G06F 8/41* (2013.01); *G06F 8/447* (2013.01); *G06F 9/45508* (2013.01); *G06F 8/437* (2013.01)

(58) Field of Classification Search
None
See application file for complete search history.

(56) References Cited

U.S. PATENT DOCUMENTS 5,740,441 A * 4/1998 Yellin ................. G06F 9/44589
714/E11.211
6,003,038 A  12/1999 Chen
(Continued)

FOREIGN PATENT DOCUMENTS

WO    2014/163168 A1    10/2014

OTHER PUBLICATIONS

Ureche, Vlad. "Compile-Time Type-Driven Data Representation Transformations in Object-Oriented Languages." (2015).
(Continued)

*Primary Examiner* — Matthew J Brophy
(74) *Attorney, Agent, or Firm* — Invoke

(57) ABSTRACT

Operations include a compilation process and a runtime process. A compiler compiles code to generate virtual machine instructions. The compiler further generates information referencing respective parameter types of the parameters of a target virtual machine instruction. The compiler stores the information external to and in association with the target virtual machine instruction. The information may be included in another virtual machine instruction that precedes the target virtual machine instruction. A runtime environment processes the target virtual machine instruction based on the information stored external to and in association with the target virtual machine instruction. Parameter types referenced by the external information override parameter types that are (a) referenced by the target virtual machine instruction itself, (b) deduced by the runtime environment and/or (c) stored directly in association with the parameter values.

18 Claims, 7 Drawing Sheets

Related U.S. Application Data

(60) Provisional application No. 62/202,909, filed on Aug. 9, 2015.

(56) References Cited

U.S. PATENT DOCUMENTS

| | | | | |
|---|---|---|---|---|
| 6,618,769 | B1* | 9/2003 | Bracha | G06F 9/44521 717/165 |
| 6,766,521 | B1* | 7/2004 | Bracha | G06F 9/44521 719/331 |
| 6,957,428 | B2* | 10/2005 | Sokolov | G06F 9/30174 712/E9.037 |
| 8,555,264 | B2* | 10/2013 | Ohrstrom | G06F 9/45504 717/116 |
| 9,043,768 | B2* | 5/2015 | Ohrstrom | G06F 9/45504 717/116 |
| 9,201,635 | B2* | 12/2015 | Jennings | G06F 8/41 |
| 2001/0052118 | A1 | 12/2001 | Steinbusch | |
| 2003/0018679 | A1* | 1/2003 | Sokolov | G06F 9/30174 718/1 |
| 2005/0216920 | A1* | 9/2005 | Tewari | G06F 9/5011 719/324 |
| 2010/0115237 | A1* | 5/2010 | Brewer | G06F 9/30036 712/34 |
| 2010/0299130 | A1* | 11/2010 | Mitsuzawa | G06F 9/4856 703/26 |
| 2012/0185834 | A1* | 7/2012 | Ohrstrom | G06F 9/45504 717/148 |
| 2014/0096116 | A1* | 4/2014 | Ohrstrom | G06F 9/45504 717/148 |
| 2015/0331681 | A1 | 11/2015 | Rose et al. | |
| 2015/0363174 | A1 | 12/2015 | Rose et al. | |
| 2016/0011982 | A1 | 1/2016 | Sandoz et al. | |
| 2016/0011992 | A1* | 1/2016 | Sandoz | G06F 3/0622 711/163 |
| 2016/0026446 | A1* | 1/2016 | Conrod | G06F 8/4434 717/151 |
| 2016/0062878 | A1* | 3/2016 | Westrelin | G06F 9/4552 717/130 |
| 2016/0202961 | A1* | 7/2016 | Goetz | G06F 9/449 717/148 |

OTHER PUBLICATIONS

Ureche, Vlad, et al. "Improving the interoperation between generics translations." Proceedings of the Principles and Practices of Programming on the Java Platform. ACM, 2015. (Year: 2015).

Myers A C et al: "Parameterized Types for Java" Conference Record of POPL '97: 24th. ACM SIGPLAN-SIGACT Symposium on Principles of Programming Language Paris, Jan. 15-17, 1997; [Conference Record of P0PL: ACM SIGPLAN-SIGACT Symposium on Principles of Programming Language], New York, ACM, US, vol. CONF. 28, Jan. 15, 1997 (Jan. 15, 1997), pp. 132-145.

Kennedy and Syrne, Design and Implementation of Generics for the .NET Common Language Runtime, 2001.

John R. Rose: "Bytecodes meet Combinators: invokedynamic on the JVM", Proceedings of the Third Workshop on Virtual Machines and Intermediate Languages, VMIL '09, Jan. 1, 2009 (Jan. 1, 2009), pp. 1-11.

Chapter 6. The Java Virtual Machine Instruction Set, retrieved from https://docs.oracle.com/javase/specs/jvml/se7/html/jvms-6.html#jvms-6.5.wide.

Brian Goetz: "State of the Specialization", Jul. 17, 2014 (Jul. 17, 2014), Retrieved from the Internet: URL:http://web.archive.org/web/20140717190322/http://cr.openjdk.java.net/~briangoetz/valhalla/specialization.html [retrieved on Jun. 19, 2015] p. 1.

B. Goetz. The State of Specialization, 2014. URL http://web.archive.Org/web/20140718191952/http://cr.openjdk.java.net/~briangoetz/valhalla/specialization.html. (Year: 2014).

* cited by examiner

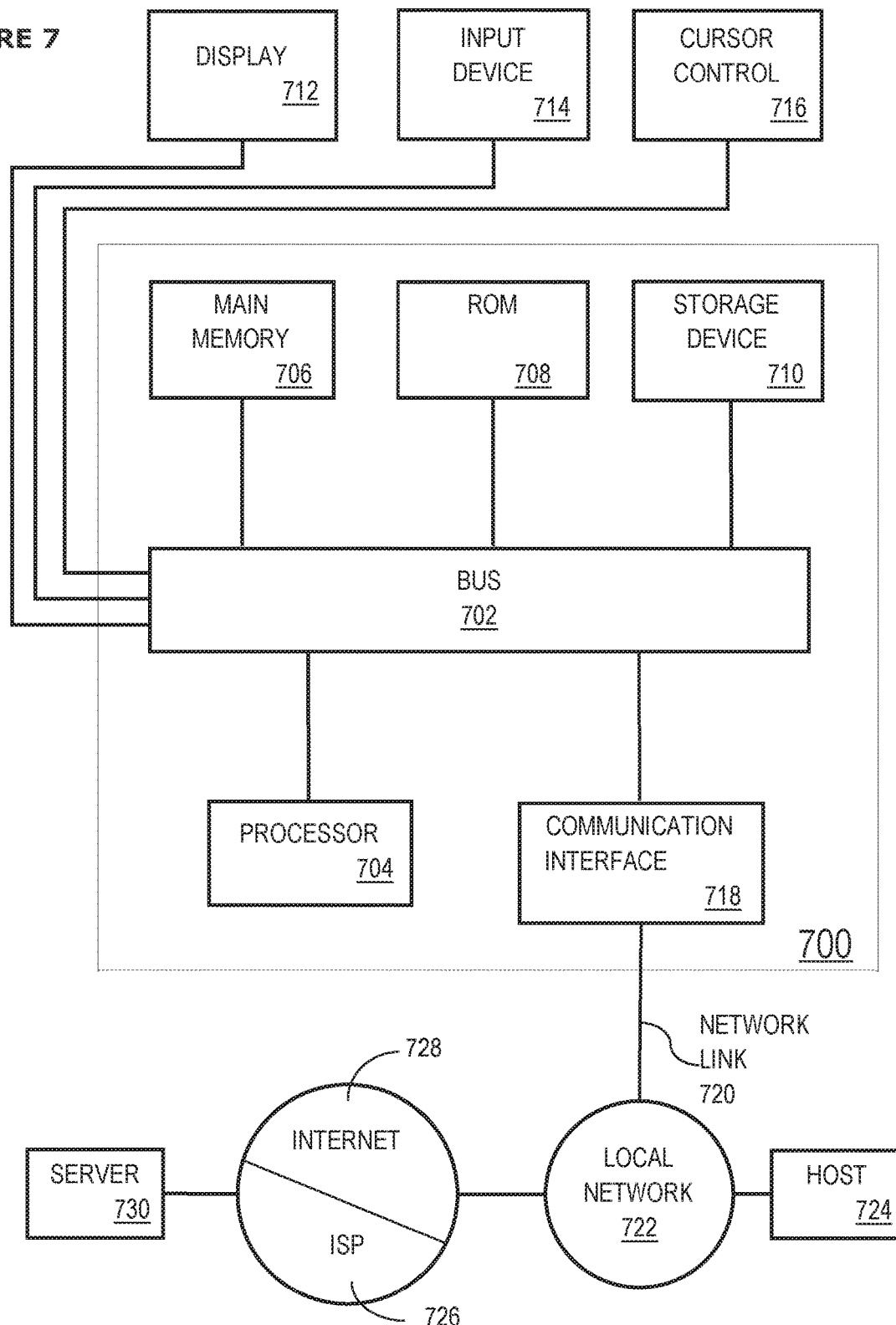

EXTENDING A VIRTUAL MACHINE INSTRUCTION SET ARCHITECTURE

PRIORITY CLAIM; INCORPORATION BY REFERENCE

This application is a Continuation of U.S. Non-Provisional patent application Ser. No. 15/005,448, entitled "EXTENDING A VIRTUAL MACHINE INSTRUCTION SET ARCHITECTURE," filed on Jan. 25, 2016, which claims benefit to U.S. Provisional Patent Application No. 62/202,909, filed on Aug. 9, 2015; each of which is hereby incorporated by reference as if included herein. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to extending a virtual machine instruction set architecture. In particular, the present disclosure relates to information that is (a) stored external to and in association with a virtual machine instruction and (b) references parameter types for parameters of the virtual machine instruction.

Furthermore, each of the following patent applications are hereby incorporated by reference as if included herein:
  (a) application Ser. No. 14/699,141 filed Apr. 29, 2015 titled "Speeding Up Dynamic Language Execution on a Virtual Machine with Type Speculation";
  (b) application Ser. No. 14/699,129 filed Apr. 29, 2015 titled "Handling Value Types";
  (c) application Ser. No. 14/660,143 filed Mar. 17, 2015 titled "Metadata-Driven Dynamic Specialization";
  (d) application Ser. No. 14/660,177 filed Mar. 17, 2015 titled "Structural Identification of Dynamically Generated, Pattern-Instantiation, Generated Classes";
  (e) application Ser. No. 14/660,604 filed Mar. 17, 2015 titled "Decomposing a Generic Class into Layers";
  (f) application Ser. No. 14/685,386 filed Apr. 13, 2015 titled Target "Typing-dependent Combinatorial Code Analysis";
  (g) application Ser. No. 14/692,590 filed Apr. 21, 2015 titled "Dependency-driven Co-Specialization of Specialized Classes";
  (h) application Ser. No. 14/692,592 filed Apr. 21, 2015 titled "Partial Specialization of Generic Classes";
  (i) application Ser. No. 14/692,593 filed Apr. 21, 2015 titled "Manual Refinement of Specialized Classes";
  (j) application Ser. No. 14/692,601 filed Apr. 21, 2015 titled "Wholesale Replacement of Specialized Classes"; and
  (k) application Ser. No. 14/743,912 filed Jun. 18, 2015 titled "Optimistically Assuming Types in a Dynamically Typed Language."

BACKGROUND

An instruction set, or instruction set architecture (ISA), is the part of the computer architecture related to programming, including the native data types, instructions, registers, addressing modes, memory architecture, interrupt and exception handling, and external I/O. An ISA includes a specification of the set of opcodes (machine language), and the native commands implemented by a particular processor.

Java bytecode is the instruction set of the Java Virtual Machine (JVM) generated by a compiler (e.g., the javac compiler). Each bytecode is composed by one, or in some cases two, bytes that represent the instruction (opcode), along with zero or more bytes for passing parameters. Some opcodes are applicable to specific parameter types. For example, opcode "60" (mnemonic "iadd") adds two values of type integer. In another example, opcode "62" (mnemonic "fadd") adds two values of type float. Details regarding the structure of the JVM are included herewith in Appendix A. Details regarding the JVM instructions set are included herewith in Appendix B.

An optimizing compiler is a compiler that minimizes or maximizes some attributes of an executable computer program. For example, an optimizing compiler may be configured for increasing run-time performance, or decreasing the amount of memory utilized by the program. Compiler optimization is often implemented using a sequence of optimizing transformations, algorithms that take a program and transform it to produce a semantically equivalent output program that uses fewer resources or executes more quickly. Compiler optimizations can be divided into multiple categories, such as loop optimizations, data-flow optimizations, SSA-based optimizations, code generator optimizations, bounds-checking eliminations, dead code limitations, and so forth.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 illustrates a system in accordance with one or more embodiments.

DETAILED DESCRIPTION

Figure 1:
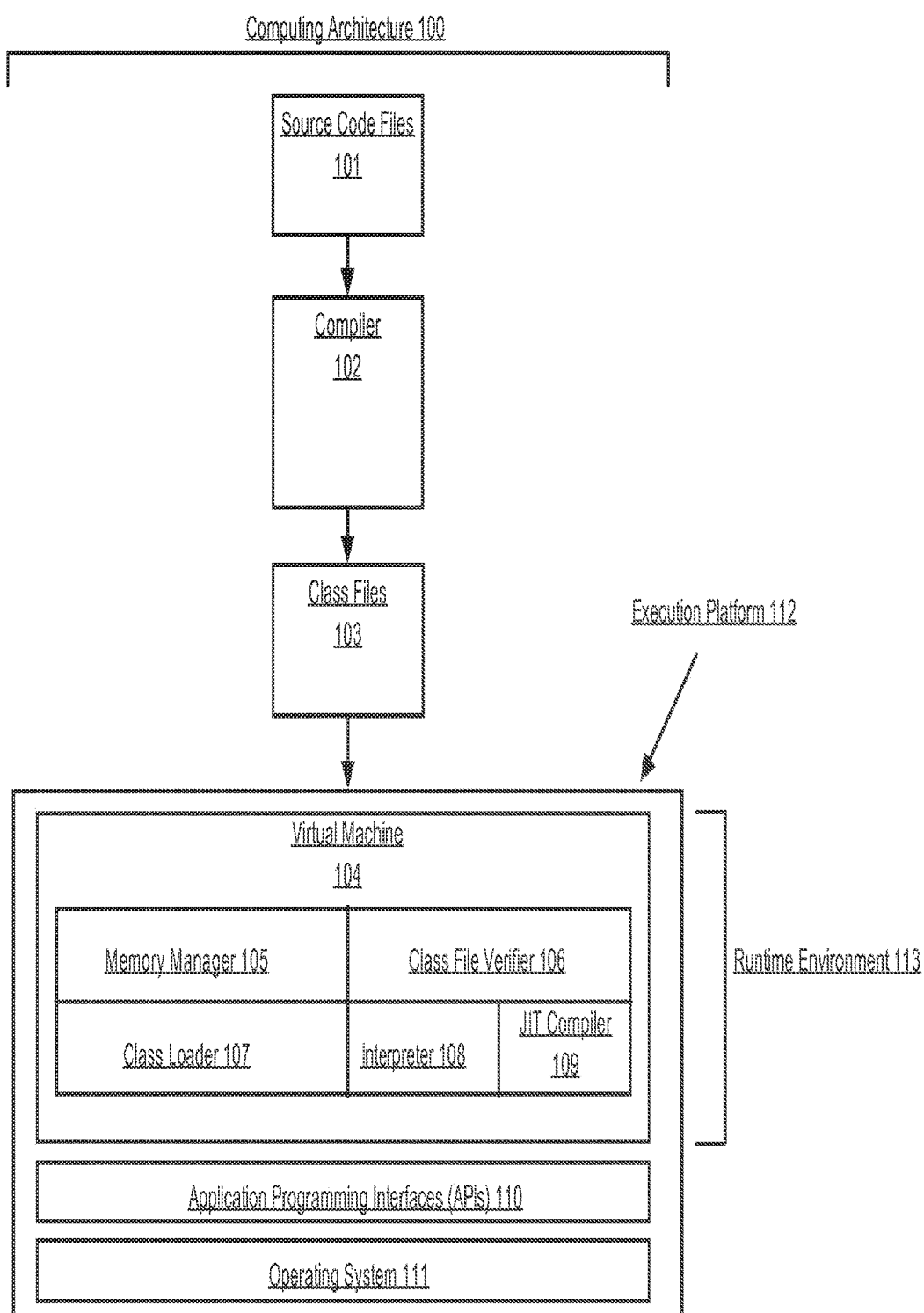
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. EXTENDING A VIRTUAL MACHINE INSTRUCTION SET ARCHITECTURE
   3.1 REFERENCING PARAMETER TYPES FOR VIRTUAL MACHINE INSTRUCTIONS
   3.2 PROCESSING VIRTUAL MACHINE INSTRUCTIONS BASED ON EXTERNALLY REFERENCED PARAMETER TYPES
   3.3 EXAMPLE USES OF REFERENCED PARAMETER TYPES
4. MISCELLANEOUS; EXTENSIONS
5. HARDWARE OVERVIEW

1. General Overview

Embodiments relate to the generation and use of information referencing a parameter type of a parameter of a target virtual machine instruction. The information may reference a variable corresponding to a type value stored at a particular location (e.g., index) in a constant pool. The variable may correspond to a MethodHandle associated with a method which returns the type value. The type value may not necessarily be known at the time the information referencing the variable is generated.

In an embodiment, a compiler generates the above-described information in a code compilation process. The compiler may store the information within the same set of bytecode that includes the target virtual machine instruction. Specifically, the compiler may generate bytecode which includes (a) the target virtual machine instruction and (b) the information stored external to and in association with the target virtual machine instruction. As an example, the information may be included within another virtual machine instruction that precedes the target virtual machine instruction within the same set of bytecode.

In an embodiment, a runtime environment processes a target virtual machine instruction, with one or more parameters, based on respective parameter types referenced by information stored external to and in association with the target virtual machine instruction. As an example, the runtime environment selects a number of bytes to be used, from a data structure, for executing the target virtual machine instruction based on the parameter types. The runtime environment may process bytecode that includes both (a) virtual machine instructions associated with such information (referencing parameter types) and (b) virtual machine instructions not associated with such information.

The same virtual machine instruction may be processed differently by the runtime environment depending on whether the virtual machine instruction is associated with external information referencing a parameter type. The parameter type, referenced by the information stored external to a target virtual machine instruction, may override (a) a parameter type referenced by the target virtual machine instruction itself or (b) a parameter type deduced by the runtime environment based on previously executed instructions.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
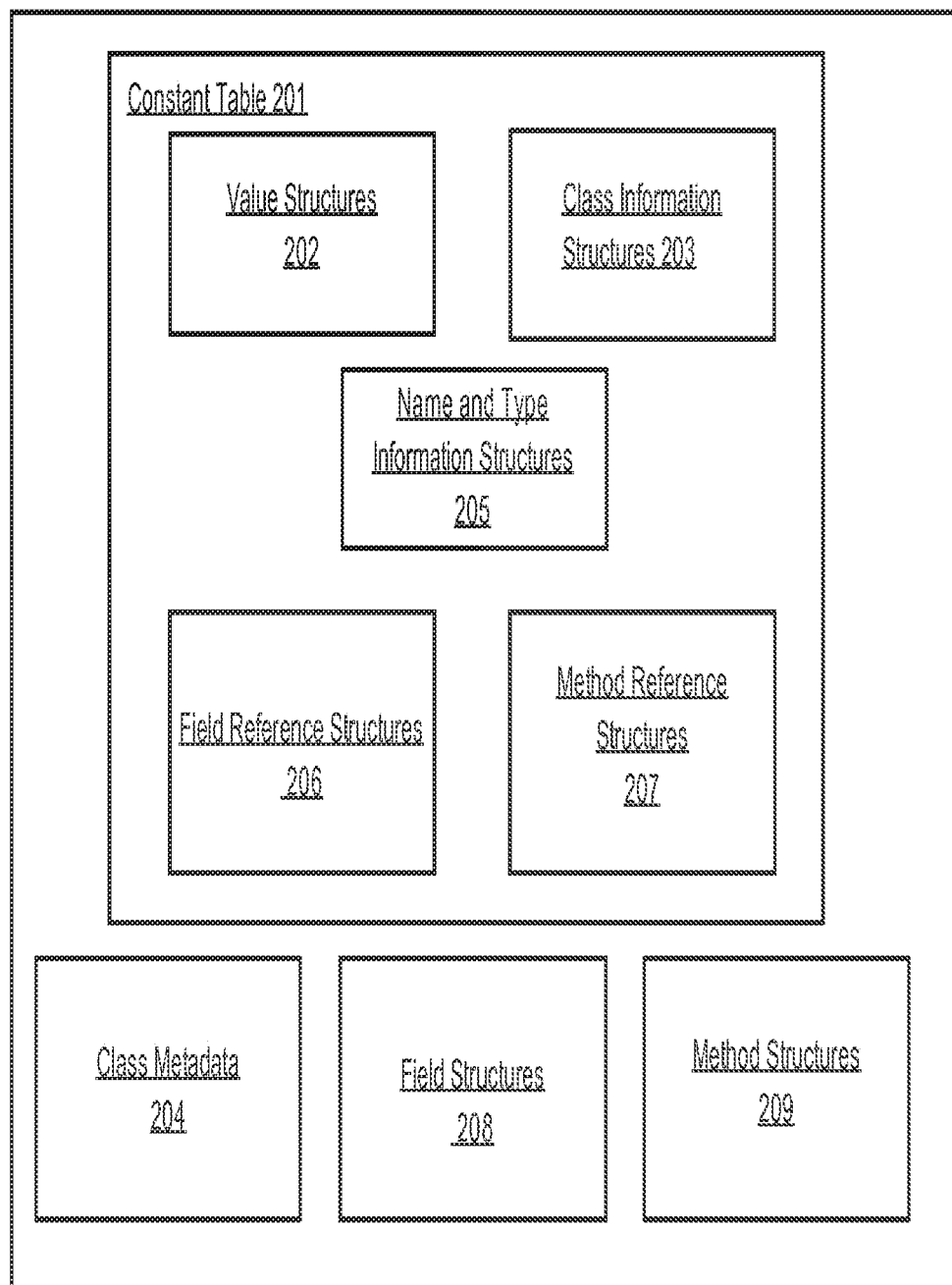
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) RetumDescriptor", where the {ParameterDescriptor} is a list of field descriptors representing the parameters and the RetumDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
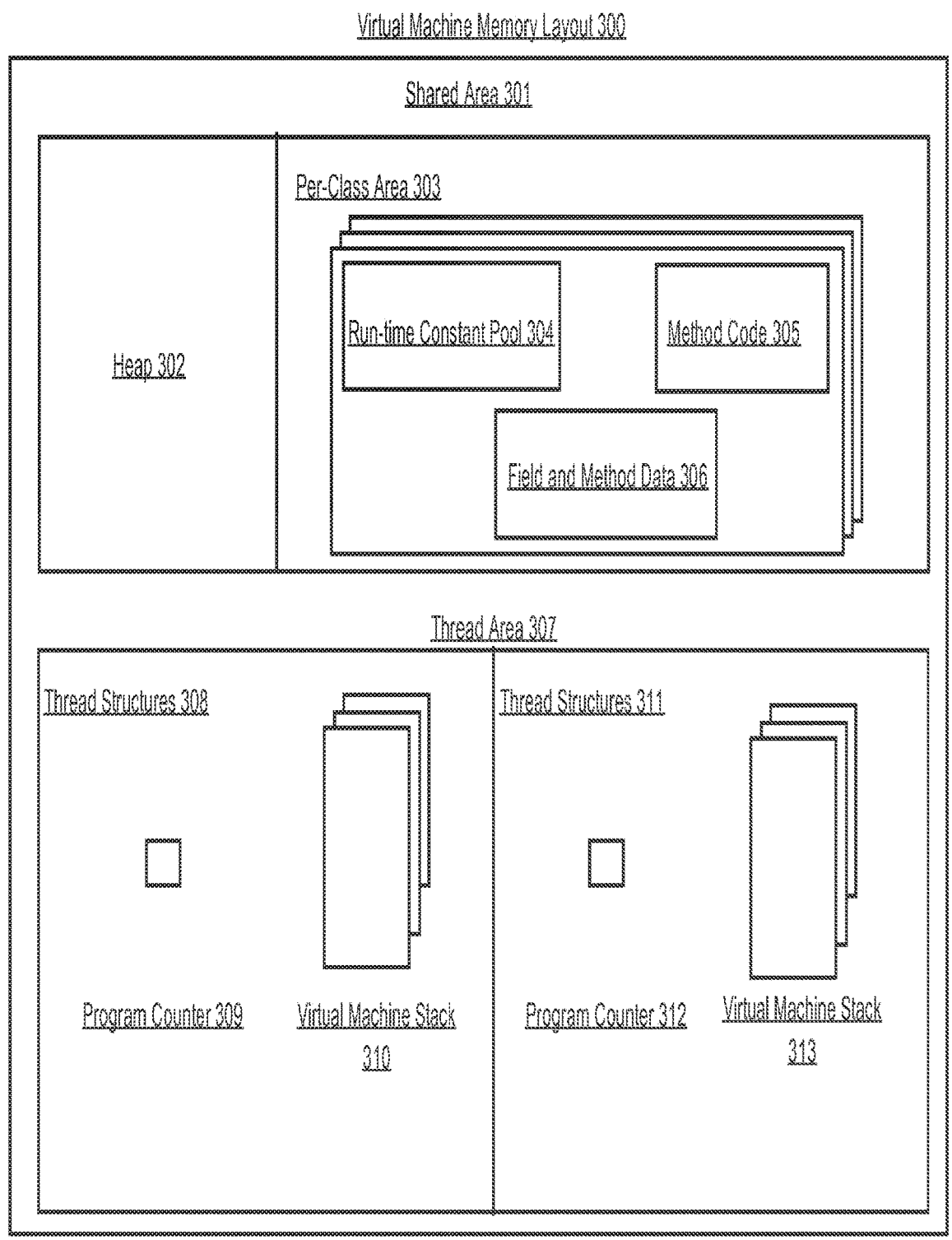
FIG. 3 illustrates an example virtual machine memory layout in block diagram form according to one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
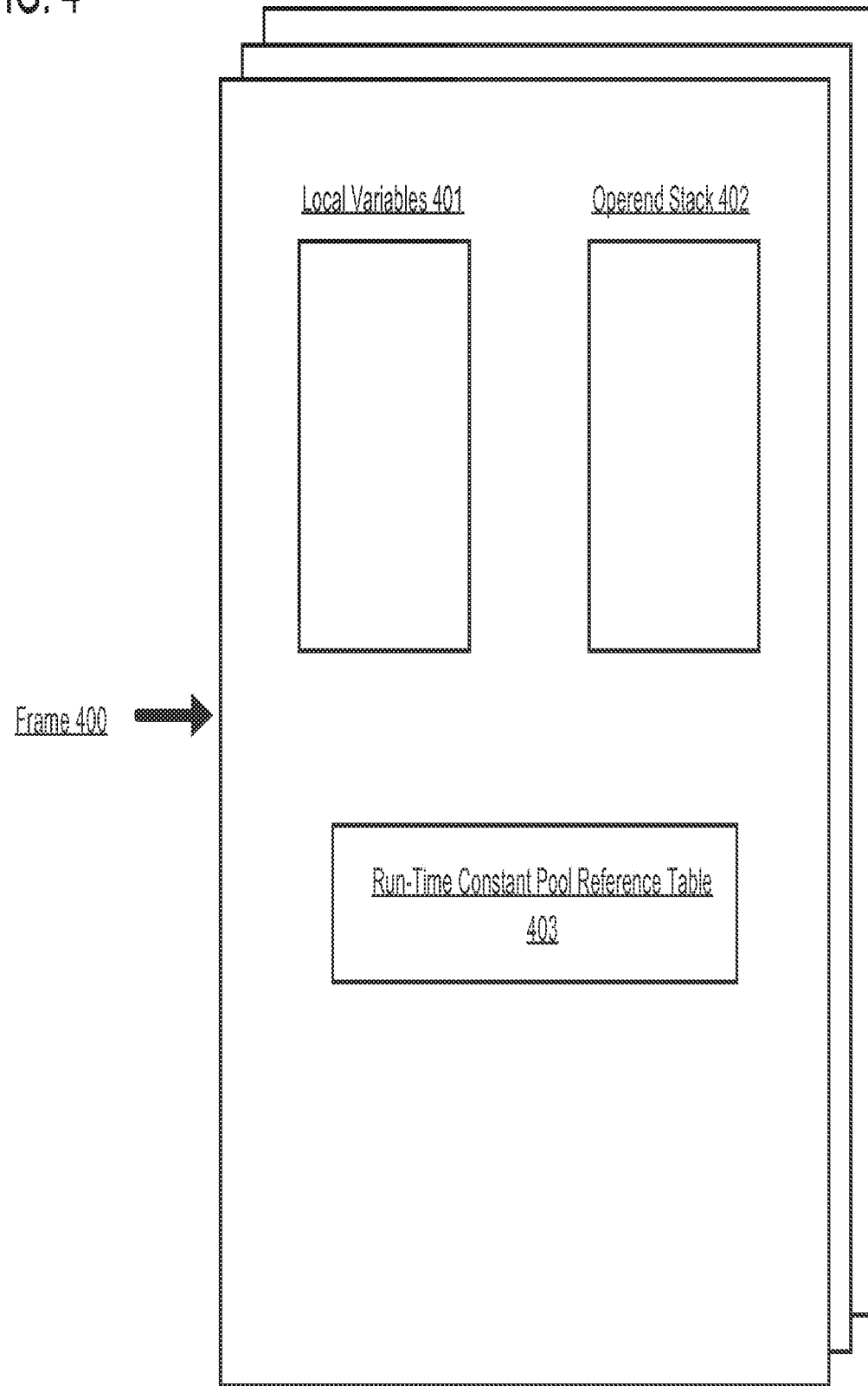
FIG. 4 illustrates an example frame in block diagram form according to one or more embodiments.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 501 onto the operand stack 502. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Extending a Virtual Machine Instruction Set Architecture

As noted above, a compiler may convert source code to bytecode including virtual machine instructions which are executable by a virtual machine. One or more embodiments are applicable to a particular virtual machine instruction which may operate on different types of parameters. Examples of virtual machine instructions, supported by the Java Virtual Machine, that may operate on different types of parameters include, but are not limited to: aload, astore, areturn, aaload, aastore, anewarray, multianewarray, and checkcast.

The different types of parameters include parameters of primitive types and parameters of reference types. Primitive types include byte, short, int, long, float, double, char, String, object, boolean, and returnAddress. Reference types include class types, array types, and interface types.

A parameter type may correspond to or comprise semantics associated with a virtual machine instruction. In one example, the parameter type may be used in relation to "value types." Value types may represent user-defined aggregate types without identity that can be surfaced in the language of the source code files and the instruction set of the virtual machine to support memory- and locality-efficient programming idioms without sacrificing encapsulation.

In an embodiment, value types are heterogeneous aggregates that can contain primitive types, reference types, or even other value types. In some embodiments, many of the definitions and encapsulation machinery used for classes, for example in Java, can be used to easily and safely build a new value type construct based data structures. For example, value types can be treated as a form of specially marked and restricted class definitions. Value types function, from a semantic perspective, as a new kind of primitive type to users of the virtual machine. A detailed description of "value types" is included herewith in Appendix C.

3.1 Referencing Parameter Types for Virtual Machine Instructions

Figure 5:
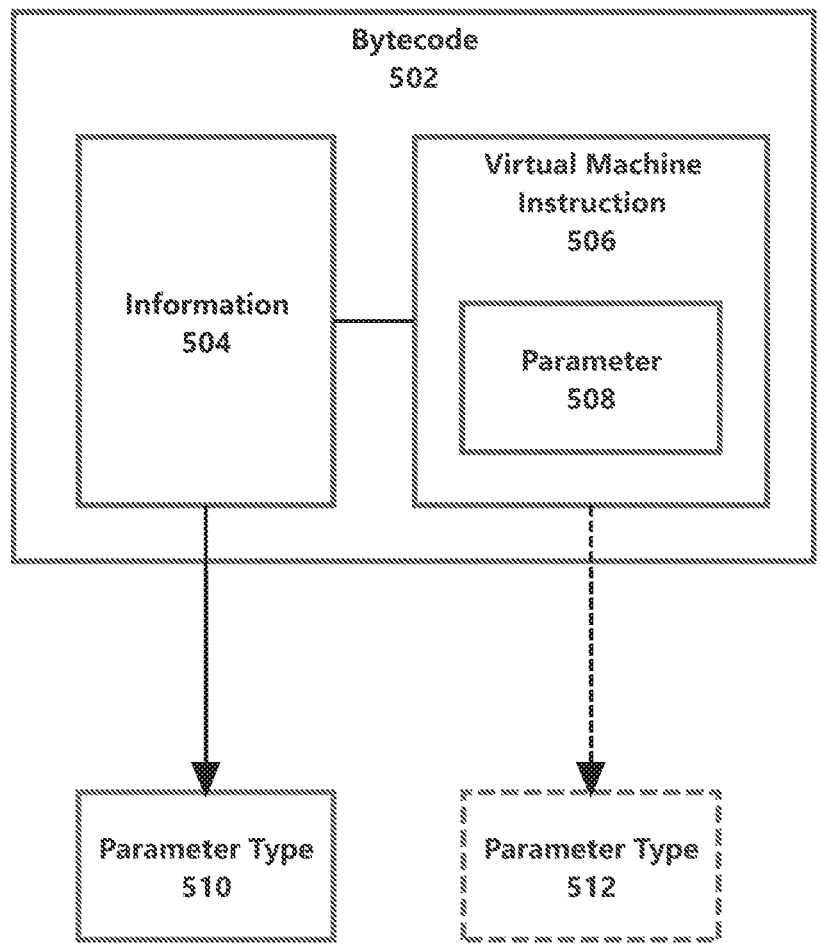
FIG. 5 illustrates bytecode in accordance with one or more embodiments.

FIG. 5 illustrates an example of bytecode (e.g., bytecode 502) which includes any number of virtual machine instructions. Each virtual machine instruction includes any number of parameters. For purposes of clarity, virtual machine instruction 506 and parameter 508 are illustrated in FIG. 5 and described below. Information 504 may correspond to another virtual machine instruction that is associated with virtual machine instruction 506, as detailed below.

In an embodiment, the compiler generates and stores information (e.g., information 504) that references a parameter type 510 for the parameter 508 of virtual machine instruction 506. The compiler stores the information 504 within the same set of bytecode 502 as the virtual machine instruction 506. The compiler stores the information 504 external to and in association with the virtual machine instruction 506. A virtual machine processes the virtual machine instruction 506 based on the parameter type 510, as described below with reference to FIG. 6. Parameter 510 overrides other parameter types (e.g., parameter type 512) which are referenced by the virtual machine instruction 506 itself or which can be deduced by the virtual machine based on previously executed virtual machine instructions (described in detail below with reference to FIG. 6).

In an embodiment, the association between the information 504 and the virtual machine instruction 506 may be indicated by a compiler (and later identified by the virtual machine) based at least on an adjacency and/or location of the information 504 with respect to the virtual machine instruction 506. As an example, information stored external to and immediately preceding the virtual machine instruction 506 may be determined to be associated with the virtual machine instruction 506. In another implementation, information stored external to and immediately following the virtual machine instruction 506 may be determined to be associated with the virtual machine instruction 506.

In an embodiment, information 504 references the parameter type 510 by referencing a variable corresponding to the parameter type 510. The value of the variable (i.e., the parameter type 510) may be stored at a particular location of a constant table. Alternatively or in addition, the particular location of the constant table may be designated for storing the value of the variable. The value of the variable may or may not be known when the information 504, referencing the variable, is (a) generated and (b) stored in association with and external to the virtual machine instruction 506.

In an embodiment, the information 504 references parameter type 510 by referencing a variable corresponding to a method handle (see class MethodHandle in Java API). The method handle is a typed, directly executable reference to an underlying method that returns parameter type 510.

In an example, information 504 includes a meta-data reference to a constant pool indicating the parameter type 510 of the parameter 508 of virtual machine instruction 506. The meta-data reference may be, for example, a 16-bit reference into the constant pool of the class corresponding to the virtual machine instruction 506. The referenced constant pool entry can be any kind of an entry that describes a type.

In an embodiment, information 504 is implemented as a second virtual machine instruction that is stored adjacent to (e.g., immediately preceding) the virtual machine instruction 506. The second virtual machine instruction includes a parameter that references the parameter type 510 of parameter 508 of the virtual machine instruction 506. The parameter of the second virtual machine instruction may reference a variable corresponding to the parameter type 510 for parameter 508 of virtual machine instruction 506. The parameter of the second virtual machine instruction may include a meta-data reference to a constant pool indicating parameter type 510 for parameter 508 of virtual machine instruction 506.

In an embodiment, a special keyword may be used to signal a reference to parameter type 510 for parameter 508 of virtual machine instruction 506. As an example, the information 504 corresponds to a second virtual machine instruction that includes a particular keyword, "typed". The particular keyword signals, to a runtime environment, that the second virtual machine includes information referencing parameter type 510 for parameter 508 of virtual machine instruction 506.

As an example, the virtual machine instruction 506 (referred to as "opcode") is preceded by type information in one of the following example formats:

| FORMAT 1: | FORMAT 2: |
|---|---|
| typed | typed |
| indexbyte1 | indexbyte1 |
| indextype2 | indextype2 |
| <opcode> | <opcode> |
|  | <opcode-operands> |

In the above example formats, "typed" is a keyword signaling type information follows for the <opcode>. In FORMAT 1, the parameters for the <opcode>, i.e., the parameters upon which the opcode is operated are stored as local variables. Examples of <opcode>, i.e., the instruction used with FORMAT 1 include, but are not limited to aload_0,1,2,3, astore_0,1,2,3, dup, dup_x1, dup_x2, dup2, dup2_x1, dup2_x2, areturn, aaload, aastore, and cmp_eq. In FORMAT 2, the parameters for the <opcode>, i.e., the parameters upon which the opcode is operated follow the <opcode>. Examples of <opcode>, i.e., the instruction used with FORMAT 2 include, but are not limited to aload, astore, anewarray, multianewarray, and checkcast.

Figure 6:
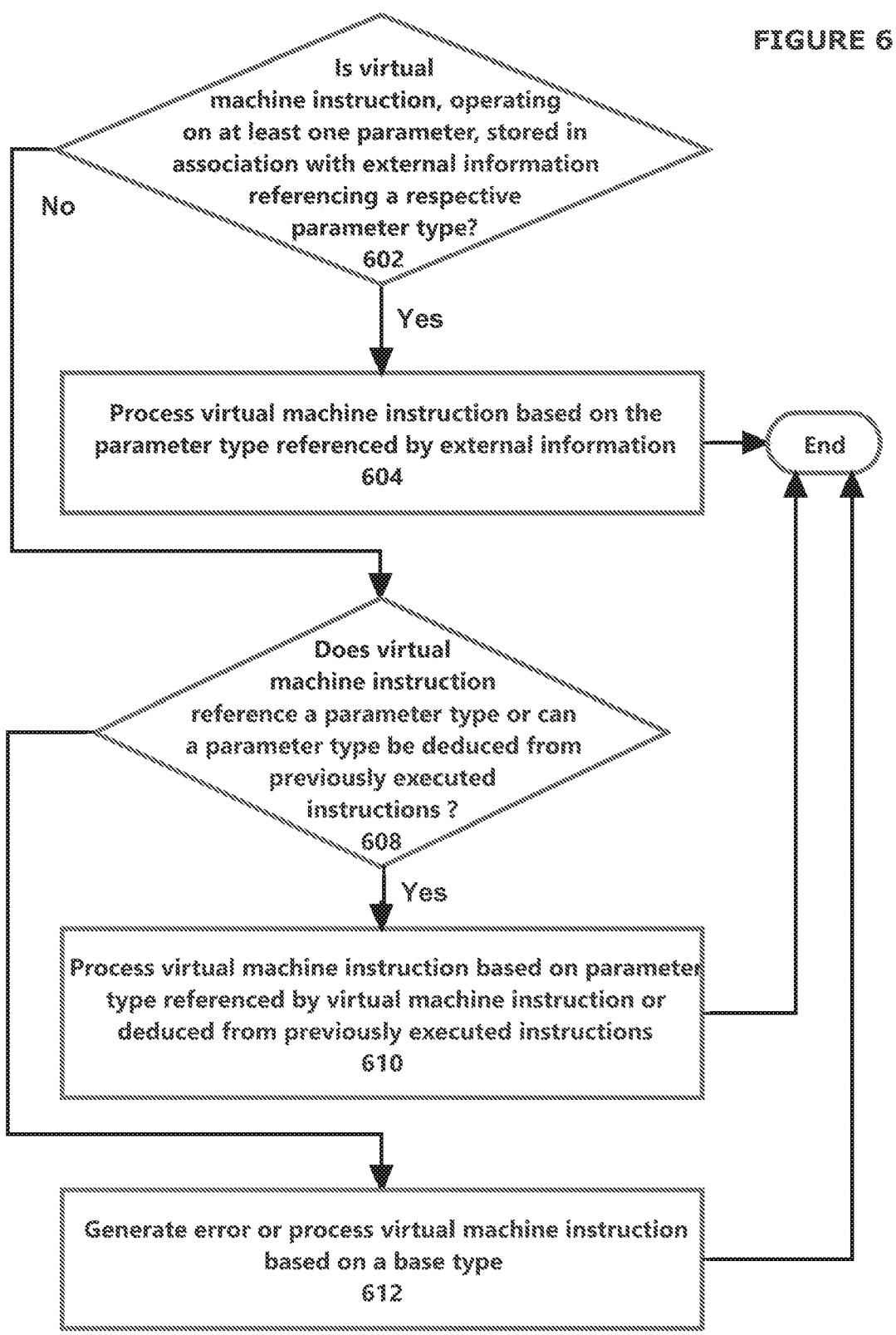
FIG. 6 illustrates a set of operations for processing a virtual machine instruction in accordance with one or more embodiments.

3.2 Processing Virtual Machine Instructions Based on Externally Referenced Parameter Types FIG. 6 illustrates an example set of operations for processing virtual machine instructions with at least one parameter in accordance with one or more embodiments. A virtual machine instruction may, for example, operate on a parameter that is stored in a data structure (e.g., a stack maintained by a virtual machine). For example, the result of executing a virtual machine instruction is stored in a stack. The next-executed virtual machine instruction operates on a parameter corresponding to the last stored value (result from previously executed virtual machine instruction) in the stack. A virtual machine instruction may specify a parameter following an opcode.

Operations described below with reference to FIG. 6 may be rearranged, omitted, or modified. Additional operations, not described below, may be performed instead of or in addition to the described operations. Accordingly, the operations as recited below should not be construed to limit the scope of any of the claims recited herein.

One or more embodiments include determining whether a virtual machine instruction, operating on at least one parameter, is stored in association with external information referencing a respective parameter type (Operation 602).

A virtual machine processing the virtual machine instruction may be configured to detect information, external to the virtual machine instruction, which references a parameter type of a parameter of the virtual machine instruction. As described above, such information may be stored within a same set of bytecode as the virtual machine instruction. Furthermore, such information may be stored in association with the virtual machine instruction.

In an embodiment, a virtual machine detects information referencing parameter types based on the information matching a defined set of criteria. The criteria may require, for example, (a) a location of the information with respect to the virtual machine instruction, or (b) a particular keyword. As an example, a compiler stores the information, referencing parameter types for parameters of a first virtual machine instruction, in a second virtual machine instruction that (a) immediately precedes the first virtual machine instruction and (b) includes a particular keyword, "typed". The virtual machine (or runtime environment) is configured to determine that a virtual machine instruction that includes "typed" corresponds to information referencing parameter types of parameters of the immediately subsequent virtual machine instruction. In other examples, a compiler may include the information, referencing parameter types of parameters of a virtual machine instruction, in other formats recognized by the virtual machine.

If external information, referencing parameter types for parameters of a virtual machine instruction, is detected, then the virtual machine processes the virtual machine instruction based on the parameter types referenced by the external information (Operation 604). This virtual machine instruction (to be processed based on the parameter types referenced by the external information) may be a complete and fully executable instruction independent of (and even in the absence of) the parameter types referenced by the external information. The information stored external to and in association with the first virtual machine instruction refines, tailors, or specializes operation of the first virtual machine instruction for a more specific purpose as indicated by the external information. In the absence of the external information, the first virtual machine instruction may still execute using a set of types that are applicable to a variety of purposes including the specific purpose.

In order to process the virtual machine instruction based on the parameter types referenced by the external information, the parameter types must first be determined. The information may reference a memory location and/or a variable which is accessed to determine the corresponding parameter types. The information may reference a Method-Handle associated with a method which is executed to return the parameter types.

Processing the virtual machine instruction based on the parameter type referenced by the external information includes executing an action that is selected based on the parameter type. As an example, a number of bytes to be processed from a data structure (e.g., a stack) may be selected based on a parameter type referenced by the external information. The bytes may be used for a data movement operation, a data comparison operation, or a data retrieval operation. As other examples, the parameter type, referenced by the external information, may be used for type casting, generic method calls, or any other kind of operation.

The parameter types referenced by the external information override other parameter types that may be identified by the virtual machine. The parameter types, referenced by the information stored external to and in association with the virtual machine instruction, override parameter types referenced by the virtual machine instruction itself. The parameter types, referenced by the information stored external to and in association with the virtual machine instruction, override other parameter types that may be deduced by the virtual machine based on previously executed instructions. The parameter types, referenced by the information stored external to and in association with the virtual machine instruction, override parameter types stored with parameter values within a data structure (e.g., stack) maintained by the virtual machine.

Multiple different techniques may be implemented for overriding parameter types. In one example, illustrated in FIG. 6, the other parameter types that may be determined by a virtual machine are never identified. Specifically, when information that is (a) stored external to and in association with a virtual machine instruction and (b) references parameter types is detected, operations 608-610 which relate to the other parameter types are omitted.

In other examples, the other parameter types (e.g., deduced by the virtual machine based on previously executed instructions, or referenced by the target virtual machine instruction itself) are first determined. Thereafter, if information that is (a) stored external to and in association with a virtual machine instruction and (b) references parameter types is detected, the over parameter types are discarded/explicitly overridden.

Returning to FIG. 6, if the external information referencing parameter types is not detected in operation 602, then the virtual machine may process the virtual machine instruction based on any parameter types that are deduced by the virtual machine based on previously executed instructions, or referenced by the target virtual machine instruction itself (Operations 608-610). As an example, a previously executed virtual machine instruction adds two integers and stores the value in a stack. The next-executed instruction operates on the last stored value as a parameter. The last-stored value in the stack is known to be an integer because it was generated by adding two integers. The parameter type integer may thus be deduced by the virtual machine. Furthermore, the parameter type integer may be stored in the stack in association with the last-stored value.

If no parameter type information is identified for a virtual machine instruction, then an error may be generated or a base type may be used as the parameter type for processing the virtual machine instruction (Operation 612). Generating an error or using a base type may depend on the virtual machine instruction, the configuration of the virtual machine, or any other factor. As an example, an "object" type may be used as a parameter type for processing a virtual machine instruction with parameters without any associated parameter types.

3.3 Example Uses of Referenced Parameter Types

Information referencing the type of the parameter(s) of virtual machine instructions may or may not be included for different virtual machine instructions. Embodiments herein relate to the generation and use of bytecode with one or both of:

(a) Virtual machine instructions stored in association with information (external to the virtual machine instructions) that reference the parameter types of the parameters of the virtual machine instructions (see operation 604).

(b) Virtual machine instructions stored without information (external to the virtual machine instructions) that reference the parameter types of the parameters of the virtual machine instructions (see operations 608-612).

In an embodiment, a decision to include the information referencing parameter types for any virtual machine instruction may depend on any number of factors. The factors include, but are not limited to, the actual type of the parameters of the virtual machine instruction, whether enhanced versatility is needed for the virtual machine instruction (e.g., in view of platform evolution), and whether specific semantics need to be signaled/are applicable (e.g., for new types).

The use of information referencing parameter types for virtual machine instructions may help avoid the need for extra value-type information. The use of preceding information referencing types for instruction parameters may provide an enhanced means for communicating the parameter types with an execution engine.

Generic Specialization: In one example, which should not be construed as limiting the scope of any of the claims, bytecode for generic classes and methods are generated such that information referencing parameter types are used when a virtual machine instruction operates on values of generic types. Specializing the generic class or method includes specializing the meta-data, associated with the parameter types of the parameters of virtual machine instructions, to include the correct type. In this manner, virtual machine instructions pertaining to generic type specializations will be strongly typed.

Adding Types:

In an embodiment, referencing parameter types allows for extending the semantics of instructions. The parameter types provide context to a particular virtual machine instruction and may be used to map to a particular set of semantics of all sets of semantics that may be applicable to the particular virtual machine instruction. New semantics for value types (elements of which may consume more than one or more machine words that are usually found in Java types) can be represented by referencing parameter types, in a constant pool, for instructions that handle value type elements.

Dynamic Language Implementation:

Dynamic language implementations that target a VM platform ISA by compiling source language functions can use parameter types to generate bytecode that is highly specific with regard to the occurring types.

As noted above, one or more embodiments are applicable to identifying types that are value types. In one example, value types have to be supported by a generic type system. A flexible generic specialization approach, as described above, may be helpful. Specializing a generic type includes patching the constant pool entries referenced by the information preceding virtual machine instructions.

In one example, inlining is an optimization that replaces method calls by substituting the call with the body of the called method. As a result, the virtual machine is able to omit jump instructions, which tend to be fairly costly. Furthermore, inlining can be performed recursively ("deep inlining"), thus if Method A calls Method B which in turn calls Method C, the contents of both Method B and Method C can be inlined into Method A. However, when a method invocation is potentially polymorphic, such as the JVM invokevirtual instruction, the virtual machine may not know for sure which implementation of the method will be called during run-time and thus should be inlined.

For example, consider an abstract class Feline which has a sub-class HouseCat and another sub-class Lion. HouseCat implements the method speak, by printing "meow" and Lion implements the method speak by printing "roar". Assume Method C takes a parameter object of type Feline and invokes the speak method of that object. Method C is called by both Method A and Method B, where Method A passes a parameter of type HouseCat to Method C and Method B passes a parameter of type Lion to Method C. In this example, if the virtual machine attempted to perform a deep inlining of Method C into Method A, the type information for the speak invocation in Method C would indicate that both type Lion and type HouseCat have been seen as the receiver at that point in the program (assuming both Method A and Method B have been executed at least once). As a result, the virtual machine would be unable to resolve which implementation of speak to inline into Method C and ultimately into Method A.

To resolve such issues, embodiments rely upon the types of the parameters of an invocation. The virtual machine accesses parameter type (referenced by information preceding the invocation) for parameters of the invocation from Method A to Method C that indicates the type of the passed parameter is HouseCat. As a result, rather than optimizing based on the assumption the parameter is of declared type Feline and being unable to resolve the receiver due to the polluted profile, the information related to the type of the passed parameter allows the virtual machine to determine that, when called from Method A, the receiver of the speak invocation is the more specific type HouseCat. Thus, parameter type flows from caller to callee based on the information referencing to parameter types. Once the more specific type has been resolved, the virtual machine is able to determine which implementation of speak to inline during the compiling and optimization process.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of steps comprising:
executing, by a virtual machine, a first set of one or more virtual machine instructions, within a set of compiled code, that (a) includes or references type information for one or more parameters of a second virtual machine instruction, and (b) includes a keyword signaling to the virtual machine that the type information is included or referenced for the one or more parameters of the second virtual machine instruction, wherein at least one of the one or more parameters, upon which the second virtual machine instruction is operated and which is associated with the type information, is stored by at least one local variable;
responsive to executing, by the virtual machine, the first set of virtual machine instructions, determining the type information for the one or more parameters of the second virtual machine instruction;
executing, by the virtual machine based on the type information determined responsive to executing the first set of virtual machine instructions, the second virtual machine instruction, within the set of compiled code, that includes a particular operation using at least the one or more parameters.

2. The medium of claim 1, wherein at least one of the first set of virtual machine instructions is adjacent to the second virtual machine instruction.

3. The medium of claim 1, wherein at least one of the first set of virtual machine instructions precedes the second virtual machine instruction.

4. The medium of claim 1, wherein the type information indicates one or more variables, in a constant pool, that references one or more parameter types.

5. The medium of claim 1, wherein at least one parameter type referenced by the second virtual machine instruction is overridden by the type information determined responsive to executing the first set of virtual machine instructions.

6. The medium of claim 1, wherein the second virtual machine instruction comprises a data movement operation, and wherein a number of bytes moved in the data movement operation is determined based on at least the type information.

7. The medium of claim 1, wherein executing the second virtual machine instructions causes performance of the particular operation on a particular number of bytes in a data structure, wherein the particular number is determined based on at least the type information determined responsive to executing the first set of virtual machine instructions.

8. The medium of claim 1, wherein the type information references a generic type.

9. The medium of claim 1, wherein the type information is not statically known during a code compilation process that generates the set of compiled code.

10. A method, comprising:
executing, by a virtual machine, a first set of one or more virtual machine instructions, within a set of compiled code, that (a) includes or references type information for one or more parameters of a second virtual machine instruction, and (b) includes a keyword signaling to the virtual machine that the type information is included or referenced for the one or more parameters of the second virtual machine instruction, wherein at least one of the one or more parameters, upon which the second virtual machine instruction is operated and which is associated with the type information is stored by at least one local variable;
responsive to executing, by the virtual machine, the first set of virtual machine instructions, determining the type information for the one or more parameters of the second virtual machine instruction;
executing, by the virtual machine based on the type information determined responsive to executing the first set of virtual machine instructions, the second virtual machine instruction, within the set of compiled code, that includes a particular operation using at least the one or more parameters;
wherein the method is executed by at least one device including a hardware processor.

11. The method of claim 10, wherein the first set of virtual machine instructions is adjacent to the second virtual machine instruction.

12. The method of claim 10, wherein the first set of virtual machine instructions precedes the second virtual machine instruction.

13. The method of claim 10, wherein the type information indicates one or more variables, in a constant pool, that references one or more parameter types.

14. A system comprising:
at least one device including a hardware processor; and
the system is configured to perform operations comprising:
executing, by a virtual machine, a first set of one more virtual machine instructions, within a set of compiled code, that (a) includes or references type information for one or more parameters of a second virtual machine instruction, and (b) includes a keyboard signaling to the virtual machine that the type information is included or referenced for the one or more parameters of the second virtual machine instruction, wherein at least one of the one or more parameters, upon which the second virtual machine instruction is operated and which is associated with the type information, is stored by at least one local variable;

responsive to executing, by the virtual machine, the first set of virtual machine instructions, determining the type information for the one or more parameters of the second virtual machine instruction;

executing, by the virtual machine based on the type information determined responsive to executing the first set of virtual machine instructions, the second virtual machine instruction, within the set of compiled code, that includes a particular operation using at least the one or more parameters.

15. The system of claim 14, wherein the first set of virtual machine instructions is adjacent to the second virtual machine instruction.

16. The system of claim 14, wherein the first set of virtual machine instructions precedes the second virtual machine instruction.

17. The medium of claim 1, wherein the keyword signals to the virtual machine that the type information follows for the second virtual machine instruction.

18. The medium of claim 1, wherein the type information overrides parameters types determined from previously executed instructions.

\* \* \* \* \*

UNITED STATES PATENT AND TRADEMARK OFFICE
CERTIFICATE OF CORRECTION

| | |
|---|---|
| PATENT NO. | : 10,802,802 B2 |
| APPLICATION NO. | : 15/948587 |
| DATED | : October 13, 2020 |
| INVENTOR(S) | : Michael Haupt et al. |

It is certified that error appears in the above-identified patent and that said Letters Patent is hereby corrected as shown below:

On the Title Page

The Inventors, item (72), delete "Postdam" and insert -- Potsdam -- therefor.

Column 2, Line 18, below the Abstract, delete "18 Claims" and insert -- 20 Claims -- therefor.

On page 2, Other Publications, Column 2, Line 10, delete "Syrne" and insert -- Syme -- therefor.

In the Drawings

On Sheet 4 of 7, reference numeral 402 (Fig. 4), Line 1, delete "Operend" and insert -- Operand -- therefor.

In the Specification

On Column 8, Line 8-15, Delete "{ParameterDescriptor}) RetumDescriptor", where the {ParameterDescriptor} is a list of field descriptors representing the parameters and the RetumDescriptor is a field descriptor identifying the return type. For instance, the string "V" may be used to represent the void return type. Thus, a method defined in the source code files 101 as "Object m(int I, double d, Thread t) {. . .}" matches the descriptor "(I D L Thread) L Object"." and insert the same on Column 8, Line 7, after "form "(" as a continuation of the same paragraph.

On Column 8, Line 8, delete "RetumDescriptor"," and insert -- RetunDescriptor, -- therefor.

On Column 8, Line 10, delete "RetumDescriptor"," and insert -- RetunDescriptor, -- therefor.

On Column 8, Line 33, delete "and13" and insert -- and 13 -- therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,802,802 B2

In the Claims

On Column 22, Line 29, in Claim 10, after "information" insert -- , --.

On Column 22, Line 56, in Claim 14, after "one" insert -- or --.

On Column 22, Line 60, in Claim 14, delete "keyboard" and insert -- keyword -- therefor.

On Column 23, Line 23, below Claim 18, insert -- 19. The medium of Claim 1, wherein the particular operation is specified by an opcode within the second virtual machine instruction.
20. The method of Claim 10, wherein at least one parameter type referenced by the second virtual machine instruction is overridden by the type information determined responsive to executing the first set of virtual machine instructions. --.